United States Patent
Ryan et al.

(10) Patent No.: US 12,475,754 B2
(45) Date of Patent: Nov. 18, 2025

(54) SECURE EXIT LANE DOOR

(71) Applicant: Overhead Door Corporation, Lewisville, TX (US)

(72) Inventors: Jason L. Ryan, Corpus Christi, TX (US); Daniel Seymour, Corpus Christi, TX (US); Don Bray, Corpus Christi, TX (US); James W. Palmer, Corpus Christi, TX (US); Federico Romero, Corpus Christi, TX (US)

(73) Assignee: Overhead Door Corporation, Lewisville, TX (US)

( * ) Notice: Subject to any disclaimer, the term of this patent is extended or adjusted under 35 U.S.C. 154(b) by 130 days.

(21) Appl. No.: 18/521,682

(22) Filed: Nov. 28, 2023

(65) Prior Publication Data

US 2024/0096159 A1    Mar. 21, 2024

Related U.S. Application Data

(63) Continuation-in-part of application No. 17/700,154, filed on Mar. 21, 2022, now Pat. No. 12,183,144, (Continued)

(51) Int. Cl.
*E05F 15/73* (2015.01)
*E05F 15/42* (2015.01)
(Continued)

(52) U.S. Cl.
CPC ............... *G07C 9/38* (2020.01); *E05F 15/42* (2015.01); *E05F 15/73* (2015.01); *G01S 13/04* (2013.01);
(Continued)

(58) Field of Classification Search
CPC ........ G07C 9/00896; G07C 9/10; G07C 9/30; G07C 9/38; G07C 9/00; G07C 9/00571;
(Continued)

(56) References Cited

U.S. PATENT DOCUMENTS 3,779,178 A    12/1973    Riseley
4,475,308 A    10/1984    Heise
(Continued)

OTHER PUBLICATIONS

"FlipFlow Twin Interlock System Description" document published Oct. 2007.
(Continued)

*Primary Examiner* — Dionne Pendleton
(74) *Attorney, Agent, or Firm* — Haynes and Boone, LLP

(57) ABSTRACT

A door system includes a corridor sized to allow humans to move through the corridor, the corridor having a first door located at a first end; a second door located at the second end; a controller operatively connected to the first and second doors for controlling the first and second doors; a first sensor oriented to detect an object on the floor, the first sensor operatively connected to the controller and a second sensor oriented to detect an object above the floor in the corridor wherein the second sensor is operatively connected to the controller and the controller is configured to one of: a) turn off the second sensor when the first sensor detects an object on the floor and b) not respond when the second sensor detects and object above the floor when the first sensor detects and object on the floor.

20 Claims, 9 Drawing Sheets

Related U.S. Application Data which is a continuation of application No. 16/267,520, filed on Feb. 5, 2019, now Pat. No. 11,282,319.

(60) Provisional application No. 62/627,026, filed on Feb. 6, 2018.

(51) Int. Cl.
*E05G 5/02* (2006.01)
*G01S 13/04* (2006.01)
*G01S 17/58* (2006.01)
*G07C 9/00* (2020.01)
*G07C 9/38* (2020.01)

(52) U.S. Cl.
CPC ......... *G01S 17/58* (2013.01); *E05F 2015/483* (2015.01); *E05F 2015/767* (2015.01); *E05G 5/02* (2013.01); *E05Y 2201/234* (2013.01); *E05Y 2400/44* (2013.01); *E05Y 2400/8505* (2024.05); *G07C 9/00896* (2013.01)

(58) Field of Classification Search
CPC G07C 9/37; G01S 13/04; G01S 17/58; E05Y 2201/234; E05Y 2400/44; E05Y 2400/8505; E05Y 2400/818; E05Y 2400/82; E05Y 2400/822; E05Y 2400/851; E05Y 2600/46; E05Y 2800/106; E05Y 2900/132; E05G 5/003; E05G 5/02; E05F 15/42; E05F 15/73; E05F 2015/483; E05F 2015/767; E05F 15/632; E05F 15/74; E05F 15/76; E05F 2015/765; H05B 47/115; E06B 2009/6836; E06B 9/68; E05B 1/0069; A61L 2/10; A61L 2/183; A61L 2/22; A61L 2/24; A61L 2202/14; A61L 2202/25

See application file for complete search history.

(56) References Cited

U.S. PATENT DOCUMENTS

| | | | |
|---|---|---|---|
| 4,481,887 A | 11/1984 | Urbano | |
| 4,530,183 A | 7/1985 | Heise | |
| 4,534,131 A | 8/1985 | Blackston | |
| 4,586,441 A | 5/1986 | Zekich | |
| 4,628,496 A | 12/1986 | Lee | |
| 4,785,580 A | 11/1988 | Olesen | |
| RE33,407 E | 10/1990 | Schwartz | |
| 5,097,454 A | 3/1992 | Schwarz | |
| 5,201,906 A | 4/1993 | Schwarz | |
| 5,647,173 A | 7/1997 | Stark | |
| 5,694,867 A | 12/1997 | Diaz-Lopez | |
| 5,697,867 A | 12/1997 | Kono | |
| 5,878,529 A | 3/1999 | Huber | |
| 6,058,652 A | 5/2000 | Uhl | |
| 6,742,301 B1 | 6/2004 | Schwarz | |
| 8,015,754 B2 | 9/2011 | Slagel | |
| 8,127,492 B1 | 3/2012 | Hellman, Sr. | |
| 8,171,864 B2 | 5/2012 | Mucio | |
| 8,819,855 B2 | 8/2014 | Prasad | |
| 8,832,997 B2 | 9/2014 | Osann, Jr. | |
| 10,021,350 B2 | 7/2018 | Rayner | |
| 11,053,729 B2 | 7/2021 | Romero | |
| 11,282,319 B2 | 3/2022 | Hewitt | |
| 12,123,247 B2 * | 10/2024 | Vonaesch | E05F 15/632 |
| 2002/0067259 A1 | 6/2002 | Fufidio | |
| 2003/0093951 A1 | 5/2003 | Ikeuchi | |
| 2005/0168574 A1 | 8/2005 | Lipton | |
| 2008/0028682 A1 | 2/2008 | Casella | |
| 2008/0110093 A1 | 5/2008 | Liles | |
| 2008/0244978 A1 | 10/2008 | Soyugenc | |
| 2009/0294704 A1 | 12/2009 | Zailer | |
| 2010/0011665 A1 | 1/2010 | Robert, Jr. | |
| 2010/0253516 A1 | 10/2010 | Lemerand | |
| 2012/0090239 A1 | 4/2012 | Hondius | |
| 2013/0021136 A1 | 1/2013 | Brunetti | |
| 2013/0298466 A1 | 11/2013 | Robert, Jr. | |
| 2015/0097651 A1 | 4/2015 | Clough | |
| 2016/0148504 A1 | 5/2016 | Fitzgibbon | |
| 2019/0128040 A1 * | 5/2019 | Mitchell | E05F 15/73 |
| 2019/0358397 A1 | 11/2019 | Staton | |
| 2023/0217571 A1 * | 7/2023 | Chen | H03K 17/94 348/506 |

OTHER PUBLICATIONS

Youtube video—https://youtu.be/gxmBrp4bkcM?t=84—published Feb. 15, 2017.

"E-Security Portal Exit Lane Breach Control Demonstration" (Passero Associates) Oct. 15, 2013 (Oct. 15, 2013) [online] <URL:https://www.youtube.com/watch?v=ACm 13U4cwZk> 0:00-2:43.

International Search Report and Written Opinion mailed May 10, 2019 in corresponding International Application No. PCT/US2019/016672, 11 pages.

Record USA, Product Data Sheet, record-USA FlipFlow airport exit lane breach control, Web page https://www.recorddoors.com/en/documents/DownloadDocument/2505 retrieved May 18, 2022, 5 pages.

* cited by examiner

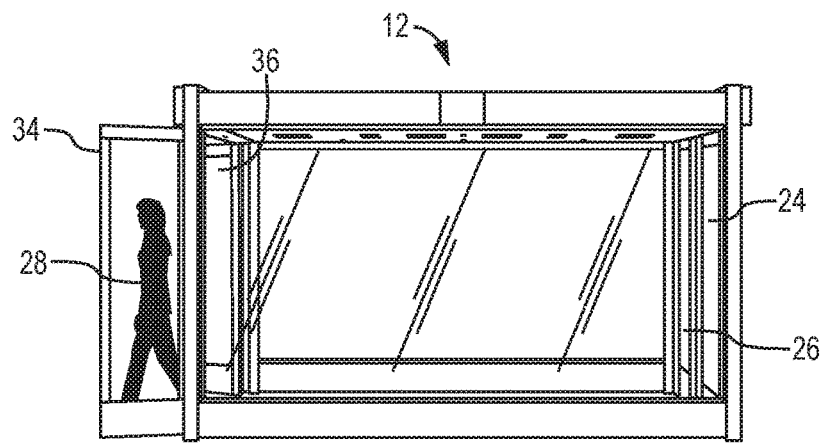
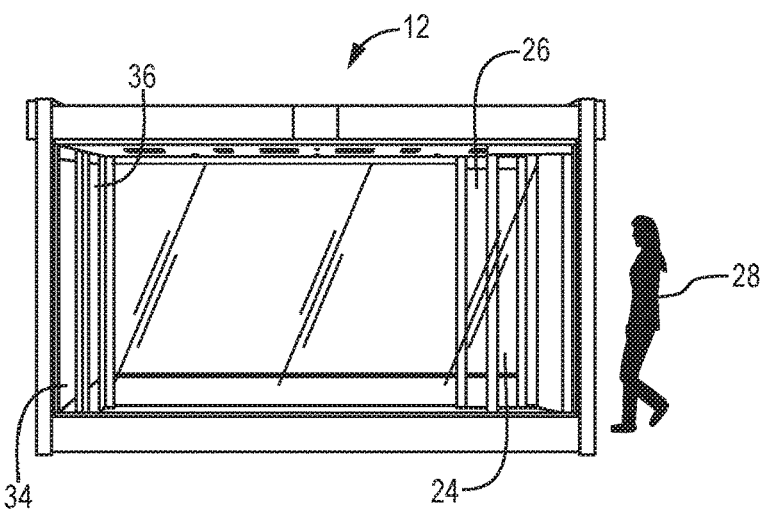
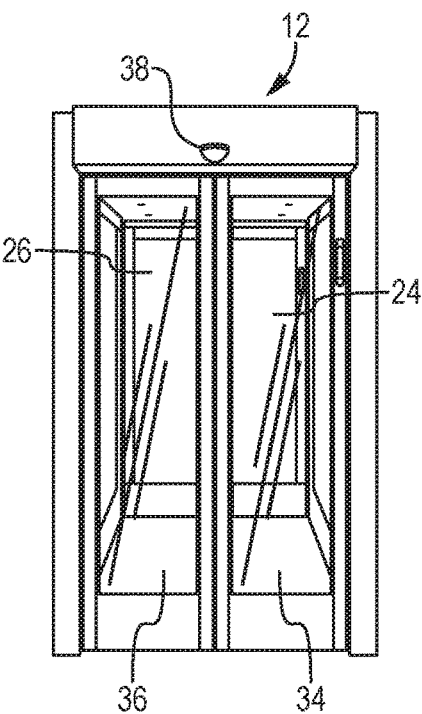
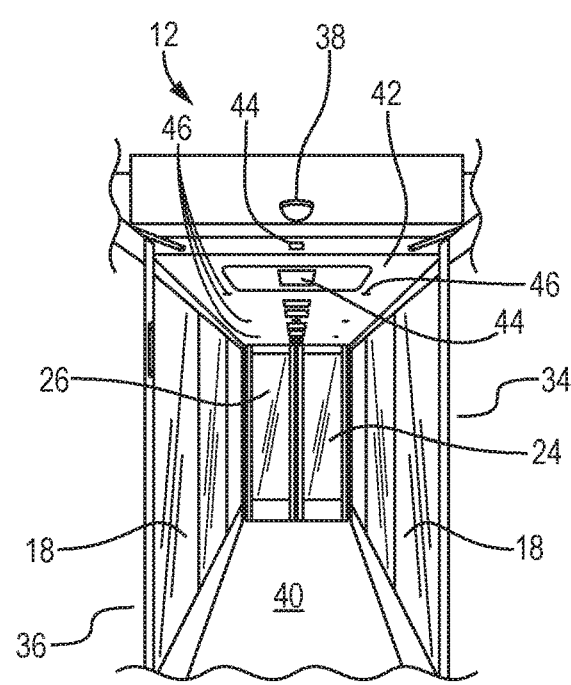
FIG. 2
FIG. 3
FIG. 4
FIG. 5

SECURE EXIT LANE DOOR

RELATED APPLICATIONS

This application is a continuation-in-part of U.S. patent application Ser. No. 17/700,154 filed Mar. 21, 2022, and issued as U.S. Pat. No. 12,183,144, which is a continuation of U.S. patent application Ser. No. 16/267,520, filed on Feb. 5, 2019, and issued as U.S. Pat. No. 11,282,319, which claims the benefit of the priority date of U.S. Provisional Pat. App. No. 62/627,026 filed on Feb. 6, 2018, entitled "Secure Exit Lane Door," all of which are incorporated herein by reference in their entirety.

TECHNICAL FIELD

This patent disclosure relates generally to secure exit lane door system and, more particularly, to a door system normally permitting only one way traffic but the door system has other modes that may permit other directions of travel for some or all traffic.

BACKGROUND

Sometimes it is desired to ensure that people all move through a door in the same direction. Sometimes people need to be moved safely and securely from a secure area to an unsecure area. One example includes people disembarking from a flight need to exit a secured area of an airport to an unsecured area.

Typically security personnel are stationed at exit doors to reduce the likelihood that unauthorized persons will enter the secured area through the exit doors, or to report to other security personnel in the event that someone does, or attempts to, enter the secure area through the exit doors.

Stationing security personnel at exit doors can be expensive and manpower intensive. Further, security personnel are subject to human error and may allow a person or object to enter a secured area through an exit door. As a result, it may be desirable to augment or replace security personnel stationed at exit doors with a door system that can reliably reduce the likelihood of people or objects entering a secure area through exit doors, and in some embodiments, report if people or object do and/or attempt to enter a secure area through an exit door.

SUMMARY

The foregoing needs are met to a great extent by embodiments in accordance with the present disclosure, which may include a door system that can reliably reduce the likelihood of people or objects entering a secure area through exit doors, and in some embodiments, report if people attempt to enter and/or objects are attempted to be entered into a secure area through an exit door.

In some embodiments, a door system is provided. The door system includes: a corridor sized to allow humans to move through the corridor, the corridor defined, at least in part by side walls, the corridor having a first end and a second end; a first door located at the first end, the first door configured to provide selective access between the corridor and a space outside of the corridor; a second door located at the second end, the second door configured to provide selective access between the corridor and a space outside of the corridor; and sensors configured to determine a direction of movement within the corridor, the sensors operatively connected to at least one of the first and second doors to cause at least one of the first and second doors to move to a closed position if any of the sensors detect a movement further than a threshold amount in an undesired direction.

In some embodiments in another aspect, a method of providing a secure exit is provided. The method includes: locating a first door at a first end of a corridor; locating a second door at a second end of the corridor; detecting movement in the corridor and closing at least one of the first and second doors when the movement is in an undesired direction further than a threshold amount.

In yet another embodiment in another aspect, a door system is provided. The door system includes: a corridor sized to allow humans to move through the corridor, the corridor defined, at least in part by side walls, the corridor having a first end and a second end; a first door located at the first end, the first door configured to provide selective access between the corridor and a space outside of the corridor; a second door located at the second end, the second door configured to provide selective access between the corridor and a space outside of the corridor; sensors configured to determine a direction of movement within the corridor, the sensors operatively connected to at least one of the first and second doors to cause at least one of the first and second doors to move to a closed position if any of the sensors detect a movement further than a threshold amount in an undesired direction; a controller operatively connected to the sensors and the doors, the controller configured to received data from the sensors and send control signals to the doors; an extension of the side walls past the second door, the extension forming a corridor extension; and a sensor configured to detect motion in the corridor extension and send data to the controller.

In yet another embodiment, a door system is provided. The door system includes a corridor sized to allow humans to move through the corridor, the corridor defined, at least in part by side walls and a floor, the corridor having a first end and a second end; a first door located at the first end, the first door configured to provide selective access between the corridor and a space outside of the corridor; a second door located at the second end, the second door configured to provide selective access between the corridor and a space outside of the corridor; a controller operatively connected to the first and second doors for controlling the first and second doors; a first sensor oriented to detect an object on the floor, the first sensor operatively connected to the controller and a second sensor oriented to detect an object above the floor in the corridor wherein the second sensor is operatively connected to the controller and the controller is configured to one of: a) turn off the second sensor when the first sensor detects an object on the floor and b) not respond when the second sensor detects and object above the floor when the first sensor detects and object on the floor.

In yet another embodiment, a method of providing a secure exit is provided. The method includes: locating a first door at a first end of a corridor having a floor; locating a second door at a second end of the corridor; mounting a first sensor to detect an object on the floor; mounting a second sensor to detect an object in the corridor located somewhere in the corridor other than the floor; and operatively connecting a controller to the first and second doors and first and second sensors and configuring the controller one of: a) turn off the second sensor when the first sensor detects an object on the floor and b) not react when the second sensor detects and object above the floor when the first sensor detects and object on the floor.

In still another embodiment, a door system is provided. The door system includes: a corridor sized to allow humans to move through the corridor, the corridor defined, at least in part by side walls and a floor, the corridor having a first end and a second end; a first sensor oriented to detect an object on the floor; a second sensor oriented to detect an object above the floor in the corridor; a controller; an alarm system operatively connected to the controller for activating when signaled to do so by the controller; the first sensor operatively connected to the controller and wherein the second sensor is operatively connected to the controller and the controller is configured to one of: a) turn off the second sensor when the first sensor detects an object on the floor and b) not respond when the second sensor detects and object above the floor when the first sensor detects and object on the floor.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 2 is a side view of a secure exit lane showing a person leaving the secure exit lane in accordance with the present disclosure;

FIG. 3 is a side view of a secure exit lane showing a person entering the secure exit lane in accordance with the present disclosure;

FIG. 4 is an end view of a secure exit lane with the doors closed in accordance with the present disclosure;

FIG. 5 is an end view of a secure exit lane with the doors opened in accordance with the present disclosure;

DETAILED DESCRIPTION

Figure 1:
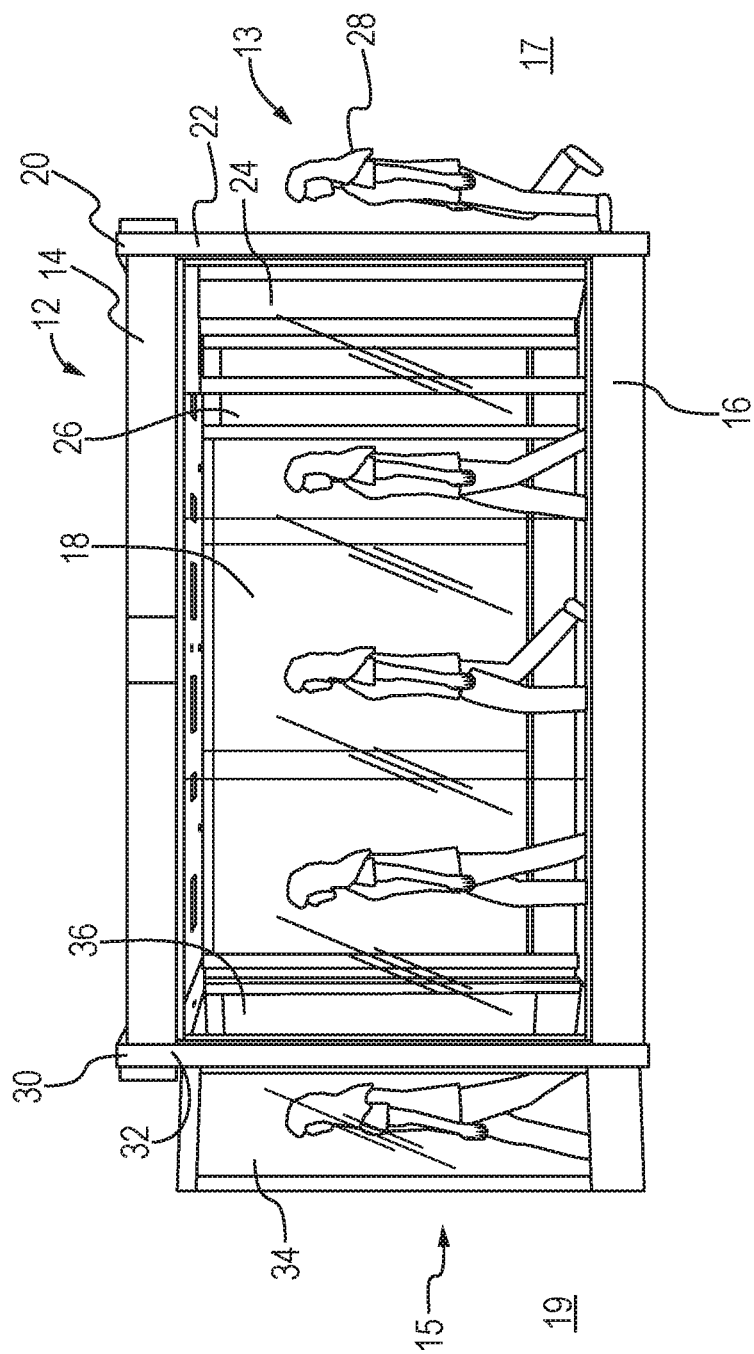
FIG. 1 is a side view of a secure exit lane in accordance with the present disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

As shown in the FIGS., a door system 12 having a reliable breach system in place can allow people to leave a secure area 17 through an exit without allowing unauthorized people or objects to enter the sure area 17 from an unsecure area 19 through the exit. This allows security personnel to serve other areas of an operation rather than monitor the door system 12 or exit. Even in instances where security personnel are present, the door system 12 can augment and/or compliment the presence of the security personnel.

The door system 12 (also known as a secure exit lane 12 or corridor 12) has two ends 13, and 15. The secure exit lane or corridor 12 has an upper frame 14 and lower frame 16. Side panels 18 connect the upper fame 14 and lower frame 16. A first door, (which may include a single door or a pair of doors that work together to provide selective access to a first portal) is located at one end 13 or 15 and a second door (which may include a single door or a pair of doors that work together to provide selective access to a second portal) at the other end 13 or 15.

An entry header 20 and entry frame 22 help define a doorway and an entry door 24 is mounted to the entry frame 22. It will be understood that the terms "entry" and "exit" are arbitrary in that they refer to a direction through which traffic primarily moves through the doors 24 and 34. In some installations the exit lane 12 may installed or modified so that the "entry" door 24 is an exit and the "exit" door 34 may be an "entry." In addition, in some modes, as described later below, the primary direction of the flow of traffic may be reversed under certain conditions. As such, the terms "entry" and "exit" are descriptive and helpful but not limiting.

An exit header 30 and exit frame 32 help define a doorway and an exit door 34 is mounted to the exit frame 32. The first door 24 and second doors 34 are separated by the bulk of the secure exit lane 12 which may by several feet long. One example exit lane 12 or corridor 12 may be 20 feet long and 5 feet wide. Other examples may have lengths in the ranges of 8 to 40 feet of separation between the first 24 and second doors 34. Some door systems 12 may have a length of 20 feet (plus or minus 6 feet) that separates the first and second doors 24 and 34. Other examples may have greater or less separation then described above and the exit lane or corridor 12 may be wider or more narrow than 5 feet.

FIGS. 2-5 are various views of secure exit lanes. FIGS. 2 and 3 are side views. FIG. 2 shows a person 28 exiting the secure exit lane 12. FIG. 3 shows a person entering the secure exit lane 12. FIGS. 4 and 5 are end views. In FIG. 4 doors 34 and 36 are shut. In FIG. 5 doors 34 and 36 are open. In FIGS. 2-5, a first set of doors 24 and 26 can be seen and a second set of doors 34 and 36 can be seen. FIGS. 4 and 5 show a sensor 38 mounted to the secure exit lane 12 that is configured to detect movement of a person or object approaching exit doors 34 and 36.

FIG. 5 shows the interior 40 of the corridor or exit lane 12. The corridor 12 is formed in part by the side panels 18. The corridor 12 includes a ceiling 42 with additional sensors 44 and lights 46 mounted in or on the ceiling 42.

Figure 6:
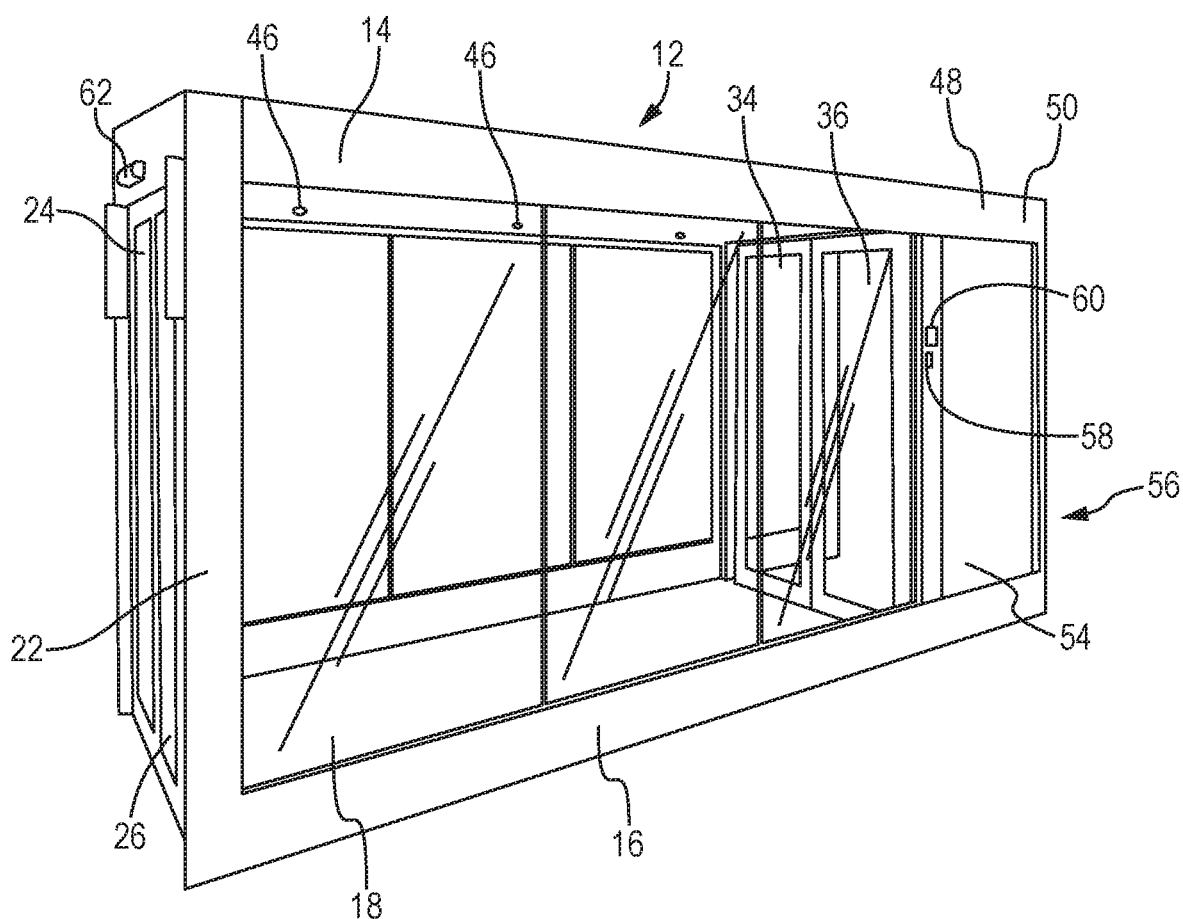
FIG. 6 is a perspective view of a secure exit lane with an exit extension in accordance with the present disclosure.

FIG. 6 is a perspective view of a secure exit lane 12 in accordance with another embodiment. The secure exit lane 12 shown in FIG. 6 includes an exit extension 48 located in the secure exit lane 12. The extension 48 includes an extension frame 50 attached to the frames 14 and 16 of the secure exit lane 12 and an extension frame header 52 (shown in FIG. 8). The extension frame 50 has an open end 56. The extension 48 is aligned with the corridor 12. The panels 54 are aligned with the panels 18 on the corridor 12. The sensors 44 (See FIG. 5) and lights 46 can be seen. The sensor 62 is located above the doors 24 and 26 and entry frame 22. A key actuated lock 58 and user interface 60 are shown attached to the secure exit lane 12.

The key actuated lock 58 may be used to lock or unlock the user interface 60. In some embodiments the key actuated lock 58 and/or user interface 60 may be used to unlock the secure exit lane 12, turn off an alarm associated with the secure exit lane 12 or otherwise control the secure exit lane 12.

Figure 7:
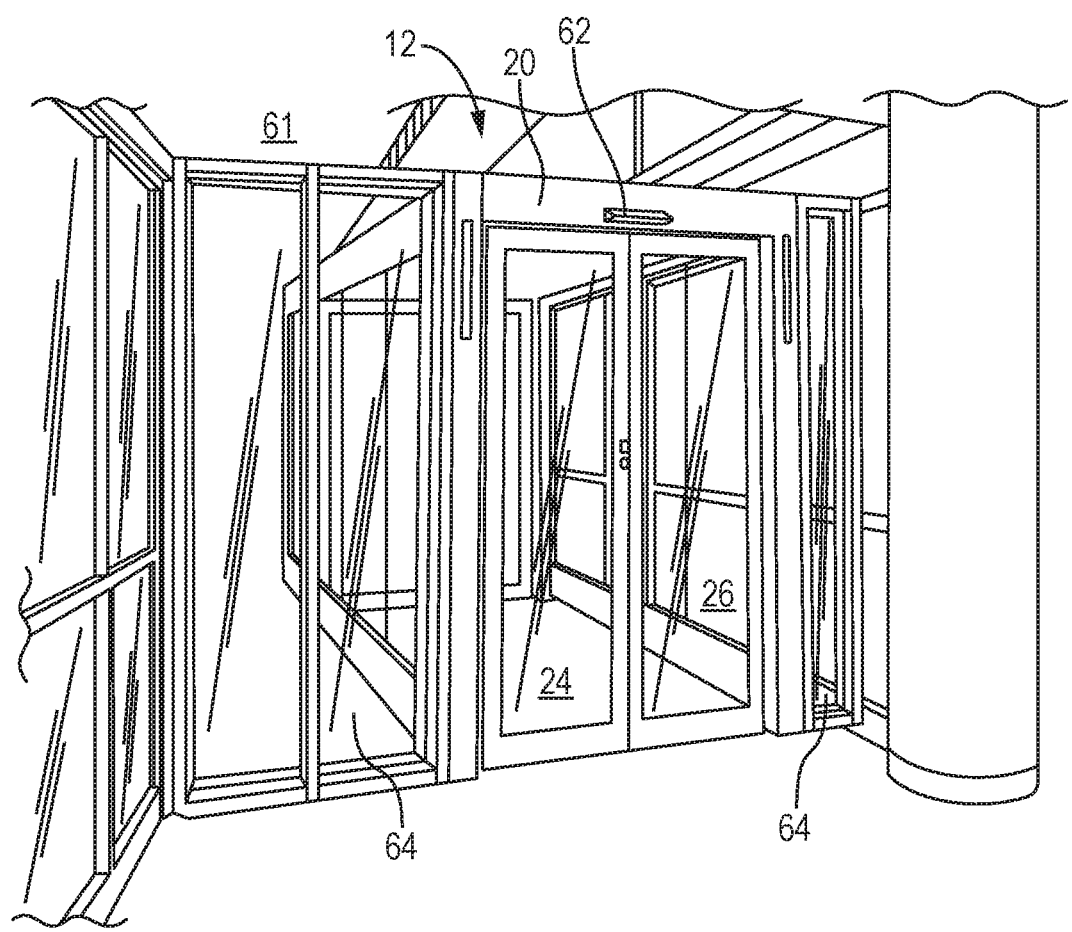
FIG. 7 is a perspective view of a secure exit lane installed in a building.

FIG. 7 shows a secure exit lane 12 installed in a building 61. An entry sensor 62 is located over the doors 24 and 26 to sense movement in the area near the entrance of the secure exit lane 12. Guiding panels 64 channel traffic toward the doors 24 and 26.

Figure 8:
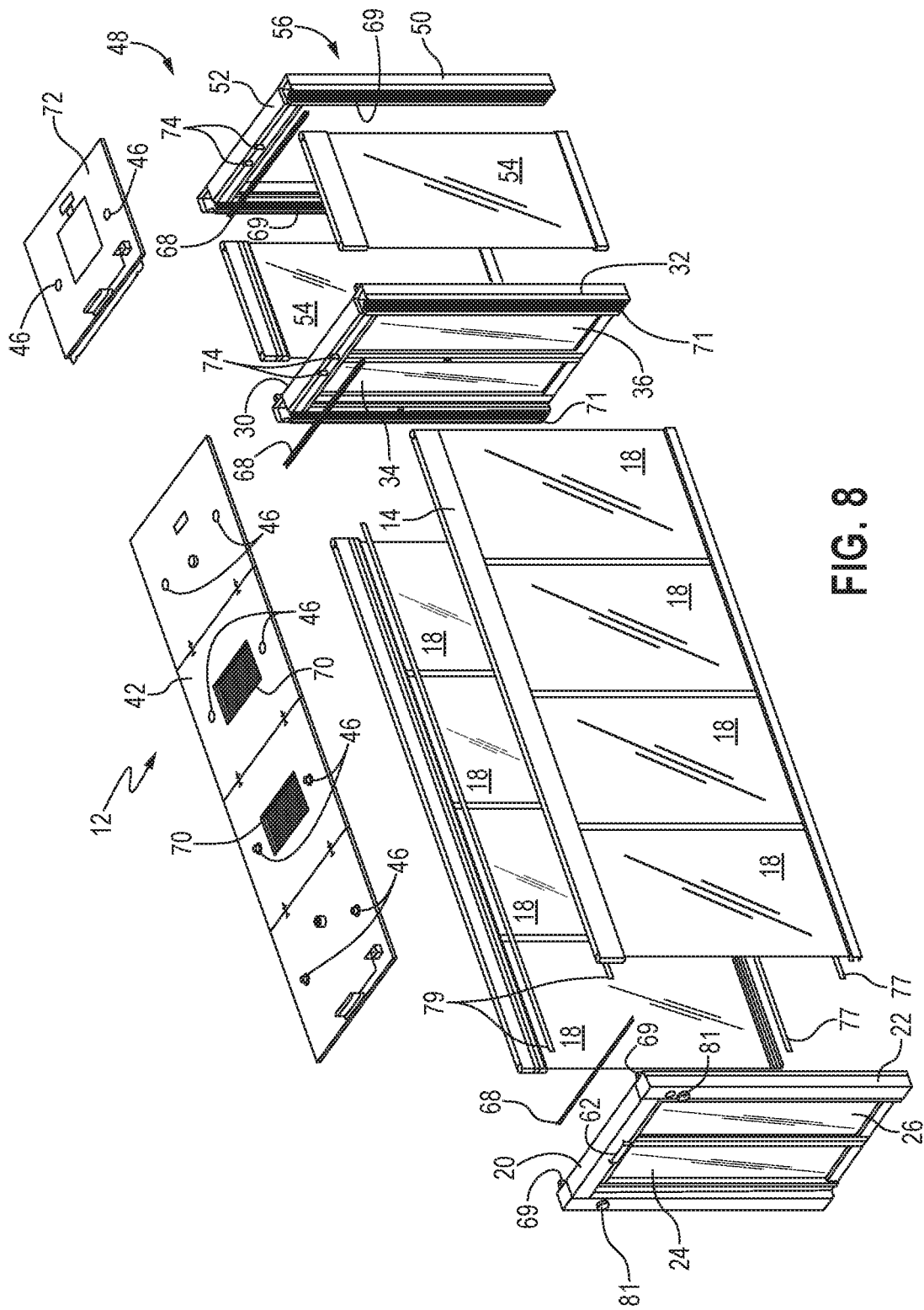
FIG. 8 is an exploded view of a secure exit lane in accordance with present disclosure.
Figure 9:
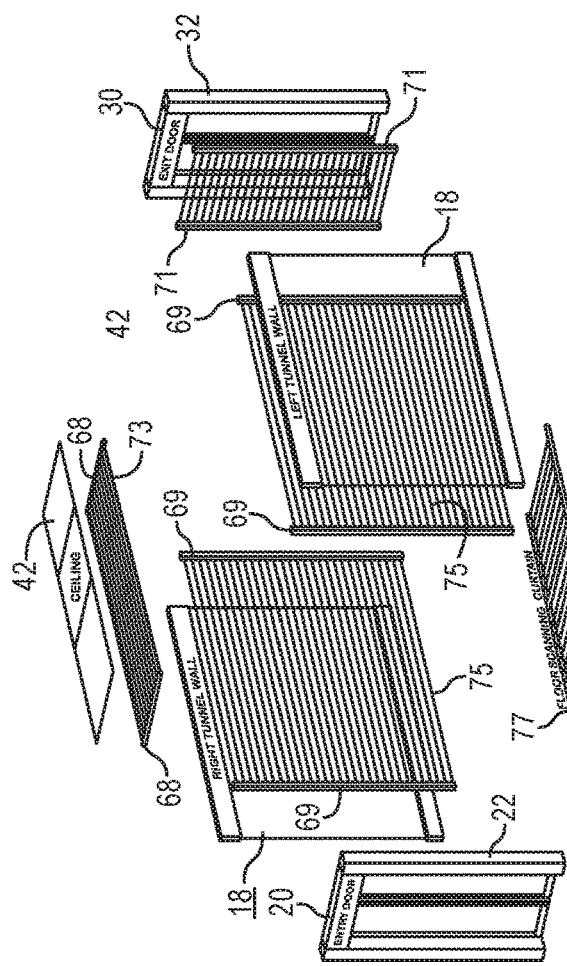
FIG. 9 is an exploded perspective view of a controller for the secure exit lane in accordance with the present disclosure.

FIG. 8 is an exploded view of the secure exit lane shown in FIG. 6. The entry frame 22 is shown with the entry header 20 and doors 24 and 26. The entry sensor 62 is located on the entry header 20. The ceiling 42 for the corridor 12 is shown with lights 46 and vents 70. As shown in both FIGS. 8 and 9, ceiling curtain sensors 68 are mounted to the entry and exit headers 20 and 30. These sense an area near the ceiling 42 as illustrated by parallel lines 73 as shown in FIG. 9. FIGS. 8 and 9 show the wall sensors 69 which may be mounted to either the entry or exit frames 22 or 32. The wall sensors 69 detect areas near the panels 18 as illustrated by parallel lines 75 in FIG. 9. Floor scanning sensors 77 may scan an area near the floor as shown in FIG. 9. Door sensors 71 may be located near the doors 34, 36. Similar door sensors may be placed near other doors for sensing movement of those doors or movement near those doors. Sensors 79 may also scan and monitor movement within the exit lane 12.

In the exit extension 48, sensors 68 may scan and sense an area near the extension ceiling 72 similar to the sensors 68 between the doors 24, 26, and 34, 36. There may also be floor sensors sensing areas near the floor, door sensors, and door sensors near the side panels 54 and the doors 32, 34 or opening 56 similar to the sensors in the areas between the doors 24, 26 and 34, 36. Other sensors 74 mounted to the exit door header 30 and extension header 52 may be configured to detect people or objects moving into the area between doors 24, 26 and 34, 36 or into the extension area. Sensors 69 may be attached to the extension frame 50 and/or exit frame 32 to scan and detect areas near the extension panels 54.

Figure 10:
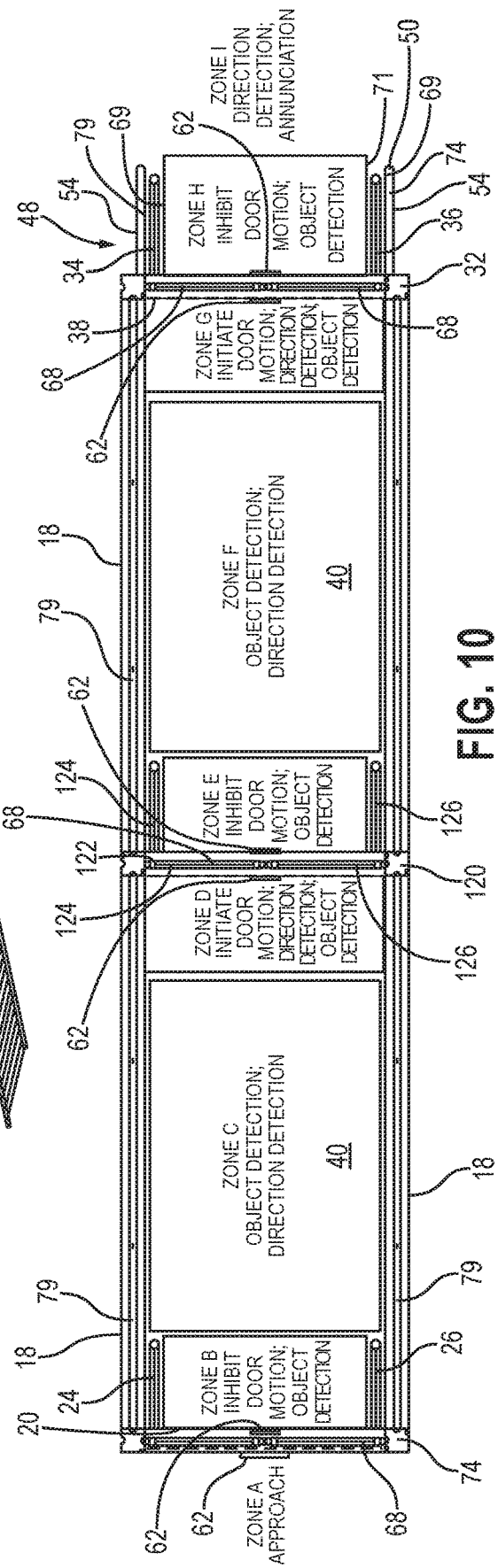
FIG. 10 is a top view of the secure exit lane in accordance with the present disclosure.

FIG. 10 is a top view showing an embodiment of the door system 12 having three sets of doors 24, 26, 34, 36, and 124, 126. For illustrative purposes, the doors 24, 26, 34, 36, and 124, 126 are shown in both the open and closed positions. A first set of doors 24, 26 are at one end, a second set of doors 34, 36 are at the other end and a third set of doors 124, 126, are in the middle of the secure exit lane 12. The infrared light curtains 68, 79 are shown which provide object/direction detection. The infrared light curtains 68 (also 71 shown in FIGS. 8 and 9) and 79 may be off the shelf items that are commercially available. The infrared light curtains 68 (also 71 shown in FIGS. 8 and 9) and 71 or 79 are operatively connected to a door controller 76 (shown in FIG. 11 and described in more detail further below) to allow the door controller 76 to determine whether to open or close the doors and/or active an alarm system or mode based on input from the infrared curtains. In embodiments having only two doors rather than three, Zone A is moved to where Zone D is shown and Zones B, C, and D and their corresponding structure are absent. Alternatively, Zones D and E are omitted with their corresponding exit lane 12 structure and Zones C and F are merged. The zones show what areas the various sensors, and/or sensor curtains monitor and detect.

The sensors 62 may be mounted to the entry header 20 and monitor the Zone A (the approach) to the secure exit lane 12 and Zone B which includes motion of the doors 24 and 26. Additional sensors 68, 69 and 71, (as shown in FIG. 9) 74, 79, and other sensors may monitor the floor, ceiling 42, along the side panels 18. Sensors 62 may be mounted to the mid door header 122 and/or mid door frame 120 and sense Zones D and E as well as the movement of the mid doors 124 and 126. Additional sensors 68, 69 and 71, (as shown in FIG. 9) 74, 79, may monitor the floor, ceiling 42, along the side panels 18 for Zones D, E, F, and G. Sensors 62 or other sensors may be mounted to the exit door header 30 and/or exit door frame 32 and sense Zones G and H as well as the movement of the doors 34 and 36. Additional sensors 68, 69 and 71, (as shown in FIG. 9) 74, 79, may monitor the floor, ceiling 42, along the side panels 54 for Zones H and I.

A purpose of the extension 48 extending beyond the exit doors 34, 36 as shown in FIGS. 6, 8, and 10 is that if someone (or an object) is going the wrong way to attempt to enter the secure exit lane 12 the person or object will be detected by sensors prior to entering through the exit doors 34 and 36. During an initial movement toward the interior 40 of the exit lane 12, warning lights and/or an audible alarm may activate to provide a warning to not enter the exit lane 12 and/or extension the 50 from the exit end. The alarm may include sirens, verbal instructions, and/or other audible and visional warnings. If continued movement into or toward the interior 40 of the exit lane is detected, the exit lane 12 may shut and lock the doors 34, 36 (or all of the doors 24, 26, and 124, 126) sound an alarm, active a camera to document the incident, and notify security personnel. In some embodiments, various threshold amounts of movement may be set to trigger the different actions taken by the secure exit lane 12. These threshold amounts may be factory set or modified on site.

Figure 11:
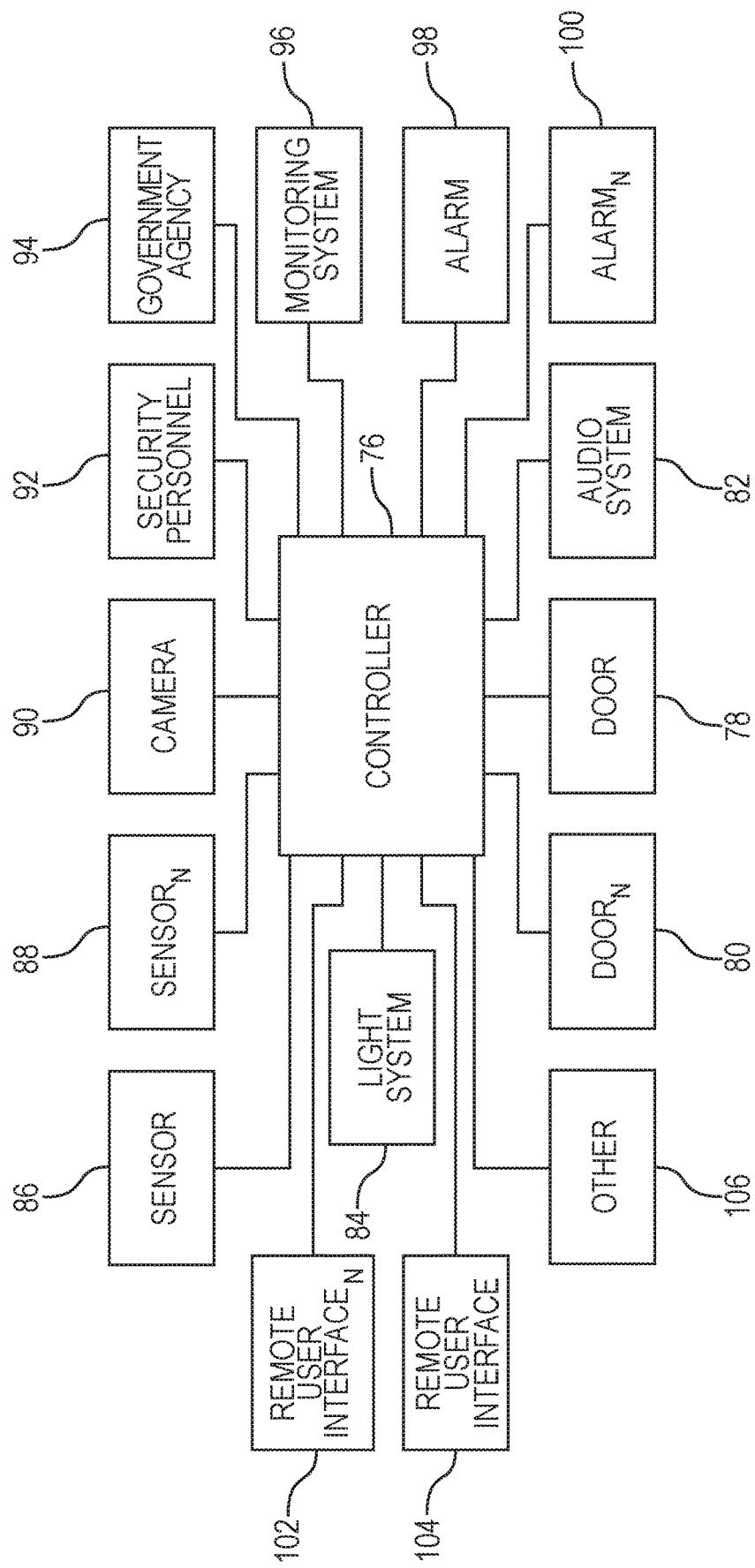
FIG. 11 is a schematic diagram of a controller for the secure exit lane in accordance with the present disclosure.

FIG. 11 is a schematic diagram of a controller 76 for the secure exit lane 12. The controller 12 may be a microcontroller and receive inputs, process those inputs, and generate outputs. The controller 76 may receive inputs from various sensors 86, 88 (88 represents any number of sensors represented by the subscript "n"). The sensors 86, 88 may include (but are not limited to) any of the above described sensors such as 38, 44, 62, 68, 69, 71, 74, 77, and 79.

In some embodiments, some, all or none of the sensors 86, 88 (such as 38, 44, 62, 68, 69, 71, 74, 77, and 79) may be infra-red sensors. Infra-red sensors may have advantages in that infra-red sensors may work in low light conditions and very high or dazzling conditions. For example, several lights may shine near the sensors 86, 88 and there may be reflections due do the reflexive surfaces associated with the exit lane 12. Some light-based sensors may lose effectiveness due to dazzling light conditions. Infra-red sensors may not have such limitations. Further, in some embodiments, at least some of the sensors 86, 88 may have the capability to count people and/or objects. As such, the sensors 86, 88 may count X many people and/or objects moving in a certain directions and Y amount of people and/or objects moving in the opposite direction. The counting data may be provided to the controller 76. The controller 76 may be configured to react if one person or object moves in a particular direction.

The controller 76 may receive data input from a camera 90, and various remote user interfaces 102, 104. The camera (s) 90 may be always on, on when the door system 12 is active, or only turn on when activated by the controller 76 when various movement thresholds are exceeded or turned on by some other triggering event. The user interfaces 102 or 104 may be the key lock 58 and/or the key pad 60 shown in FIG. 6 or they could be computers, tablet computers, cell phones, or other devices that are configured to communicate with the controller 76.

The controller 76 may send output signals to control features of the secure exit lane 12, provide data to external devices, to request security assistance, to provide instructions to users of the secure exit lane 12 or for any other purpose. For example, the controller 76 may communicate with security personnel 92 if the data provided to the controller 76 indicates a person or object is moving the "wrong" way through the exit lane 12. In addition, if other faults or conditions are detected, the controller 76 may contact security personnel 92. The security personnel 92 may include local law enforcement, private security, Federal law enforcement, or any other security personnel. The controller 76 may also send data to a government agency 94 such as the Transportation Security Administration (TSA), or the like or other remote monitoring system 96. The data may include data the sensors 86, 88, and/or data from the camera(s) 90 input to the controller 76. The data may also include operational data regarding the secure exit lane 12.

The controller 12 sends control signals to the door 78, 80 (the door 80 represents any number of doors represented by the subscript "n"). The doors represented by blocks 78, 80 in FIG. 11 may include doors 24, 26, 34, 36, 124, and 126 shown in the FIGS. or other doors. In some embodiments, the controller 76 may send control signals to an audio system 82 and/or a light system 84. The audio system 82 and the light system 84 (see reference number 81 in FIG. 8) may be operated together or separately to provide warnings or instructions to persons attempting to approach, enter, or move through or have objects enter, approach, or move through the secure exit lane 12 in the wrong direction.

In some embodiments, if the sensors 86, 88 detect persons or objects approaching, entering or moving through the exit lane the wrong way, the controller 76 has a threshold amount where the controller 76 takes no action. This may avoid action for unimportant or trivial movements. If the detected movement exceeds the threshold amount, the controller 76 may active the audio system 82 and/or light system 84 to warn or direct people near the secure exit lane 12 to stop moving (or moving an object) toward (or toward an interior of the) the exit lane 12 or the wrong way through the exit lane 12. This may be particularly used to warn people to not move or move objects from a non-sure area 19 toward a secured area 17 via the exit lane 12.

If the detected movement through exit lane exceeds another threshold amount after the audio 82 and/or light 84 systems have been activated an alarm system 98 and/or alarm systems 100 may be activated by the controller 76. One alarm system 98 may be located on or proximate to the secure exit lane 12. This alarm system 98 may warn people that the doors 78 and 80 are shutting and locking. (Which may be done by control signals to the doors 78 and 80 from the controller 76). A second alarm system 100 may be remotely located and warn security personnel 92, governments agencies 94 and/or a monitoring system 96 that movement by one or more persons or objects have moved or attempted to move in an undesirable direction toward, into, or through the secure exit lane 12 (and in some embodiments, including the extension portion 48).

A door system 12 can be modified to best fit a desired security level or mode of operation. For example, different levels or modes may include: interlock, lockdown, all open, cleaning/service, and free flow mode.

In certain applications, it may be desirable to have different levels of security for the secure exit door 12. For example, in case of emergency or fire, it may be desirable to allow the secure exit lane 12 to open its doors 78, 80 to allow the free passage of first responders and/or allow for the evacuation of people. Other times such as cleaning or performing maintenance on the secure exit lane 12 it may be desirable to allow the secure exit lane 12 to operate in a modified way. Further, various installations may have different security requirements so it may be desirable to allow the secure exit lane 12 to operate in various way to accommodate various local conditions. As such, the secure exit lane 12 and operate in various modes. Each mode may be useful for various operation conditions. The following is a description the various modes the controller 76 may be set to operate the secure exit lane 12 in a desired way to accommodate local conditions. In some embodiments the controller 76 may be set to the various modes via remote a user interface 102, or 104.

When a security need is moderately low, the door system 12 may be configured to operate in a free flow mode. In the free flow mode, all of the doors 78, 80 may stay open to allow foot traffic to flow in a single direction. Sensors 86, 88 associated with the door system 12 may detect if a person tries to move in the opposite direction of flow (the "wrong" direction) and send a signal to a door controller 76. The controller 76 may close a first door or set of doors 78 or 80 (for example the exit doors 34 and 36 and/or entry doors 24 and 26) to deny access to the person moving the wrong way to the secure area. In other embodiments, the door system 12 may close the second door (or set of doors) or both first and second (sets of) doors 78, 80 when a person and/or object is detected moving the wrong way. In some embodiments, the door system may allow a person to move a small distance in the wrong direction (for example a step or two) before closing the first and/or second (or sets of) doors 78, 80.

As mentioned above, if a person is detected moving the wrong way, an alarm system 98, 100 may be activated or the door system 12 may enter an alarm mode. The alarm mode, the secure exit door (aka the door system) 12 may sound an audible signal, give voice commands to tell people to move in the correct direction, active a lights system 84, activate a camera(s) 90 and/or alert security personnel 92. The door system 12 may also detect if objects (such a contraband, luggage, bags, or other items) move the wrong way through the door system 12. If objects are detected as moving the wrong way or are stationary for too long a time or are unattended, the first, second and/or both doors (or sets of doors) 78, 80 may be shut and/or the alarm system 98, 100 activated or the door system may enter an alarm mode.

The door system 12 is adapted to permit an authorized official to reset the door alarm(s) 98, 100 and allow the doors 78, 80 to reopen. This may require an authorized official to turn a key such as the key operated user interface 58, operate a user interface 60, or remotely reset the door system 12 with a remote user interface 102 or 104.

If it is desired to operate the door system 12 in a higher security mode, the door system 12 may be set to operate in an interlock mode. The modes may be selected by an authorized official by turning a key to a specific position, entering a command, code, or a sequence in the key operated user interface 58, via a user interface 60, or remotely setting the door system 12 to a desired mode with a remote user interface 102, 104.

In the interlock mode, the door system 12 and controller 76 may be more strict in its operation. Allowance thresholds may be smaller or reduced to zero. For example, the door system 12 may allow a person to move a shorter distance the wrong way (or not at all) than in the free flow mode before shutting the first and/or second doors 78, 80 and triggering the alarm 89, 100 or entering an alarm mode. In the interlock mode, not all of the doors 78, 80 or sets of doors 78, 80 may be open at the same time. In the interlock mode, the first door (or set of doors) 78 may open while at least one other door or set of doors 80 is shut. For example, exit doors 34, 36 may be closed, but entry doors 24, 26 may be opened to allow people to enter the secure exit lane 12. Then the entry door(s) 24, 26 will shut and the exit door(s) 34, 36 will open to allow people to exit the secure exit lane 12. In optional embodiments, once it is detected that everyone (and/or everything) has exited the secure exit lane 12, the exit door(s) 34, 36 will close. The process may then be repeated with the entry door(s) 24, 26 again opening.

The door system 12 may also be set to a lockdown mode. In the lock down mode, both the entry door(s) 24, 26 and exit door(s) 34, 36 (and other sets of doors 124, 126 if equipped) are closed and/or locked to prevent anyone (and/or anything) from leaving the area. The door system 12 may stay in a lock down mode with both the first and second doors locked until operated by an authorized user using any of the remote user interfaces 58, 60, 102, 104 as discussed above.

The door system 12 may also be set to an all open mode. In the all open mode, all doors 78, 80 are moved to the open position. The detection sensors may be disabled to allow the doors 78, 80 to stay open and the alarm(s) 98, 100 may not be triggered. In other embodiments, the alarm(s) 98, 100 may be triggered and a notification sent to entities 92, 94, 96 monitoring the door status when the door system 12 is placed in all open mode. This allows rapid evacuation of the secure area during emergencies such as a fire and allows entry to the secure area for first responders or others who may need access.

The door system 12 may have a cleaning/maintenance mode. In the cleaning mode, one door (or set of doors) 78, 80 is open, while the other door (or set of doors 78, 80) is shut to allow cleaning and/or maintenance personnel to service the door system 12 without allowing access to the secure area 17.

Figure 12:
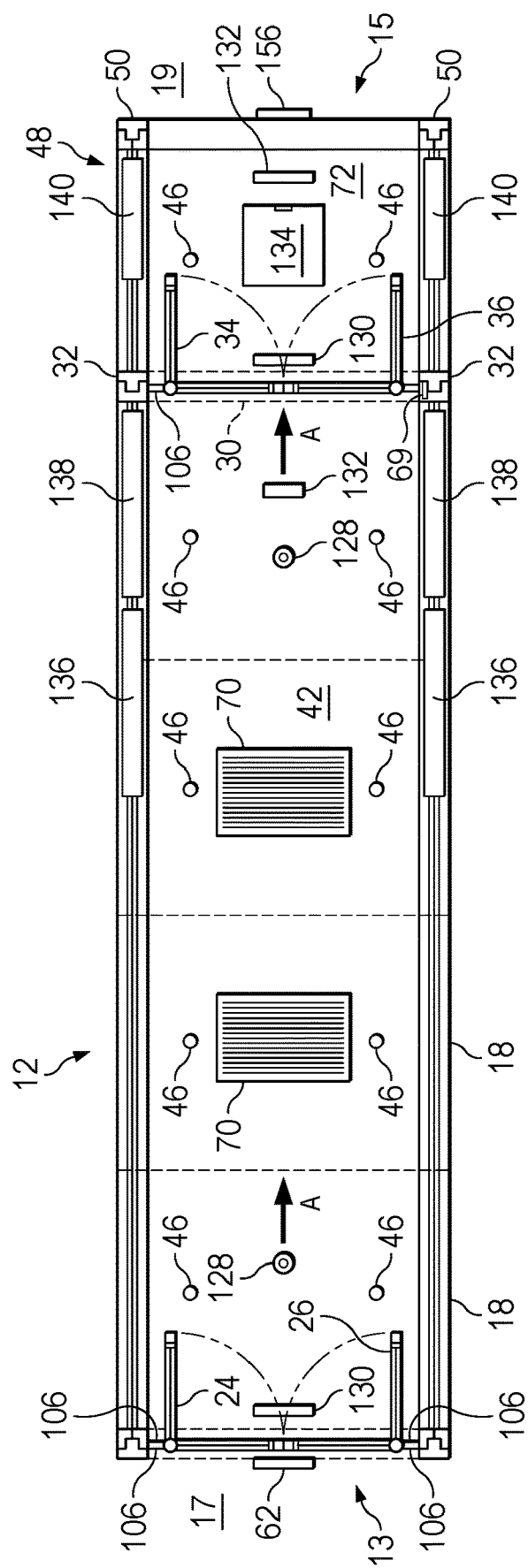
FIG. 12 is a view of a bottom of a portion of a secure exit lane in accordance with the present disclosure.
Figure 13:
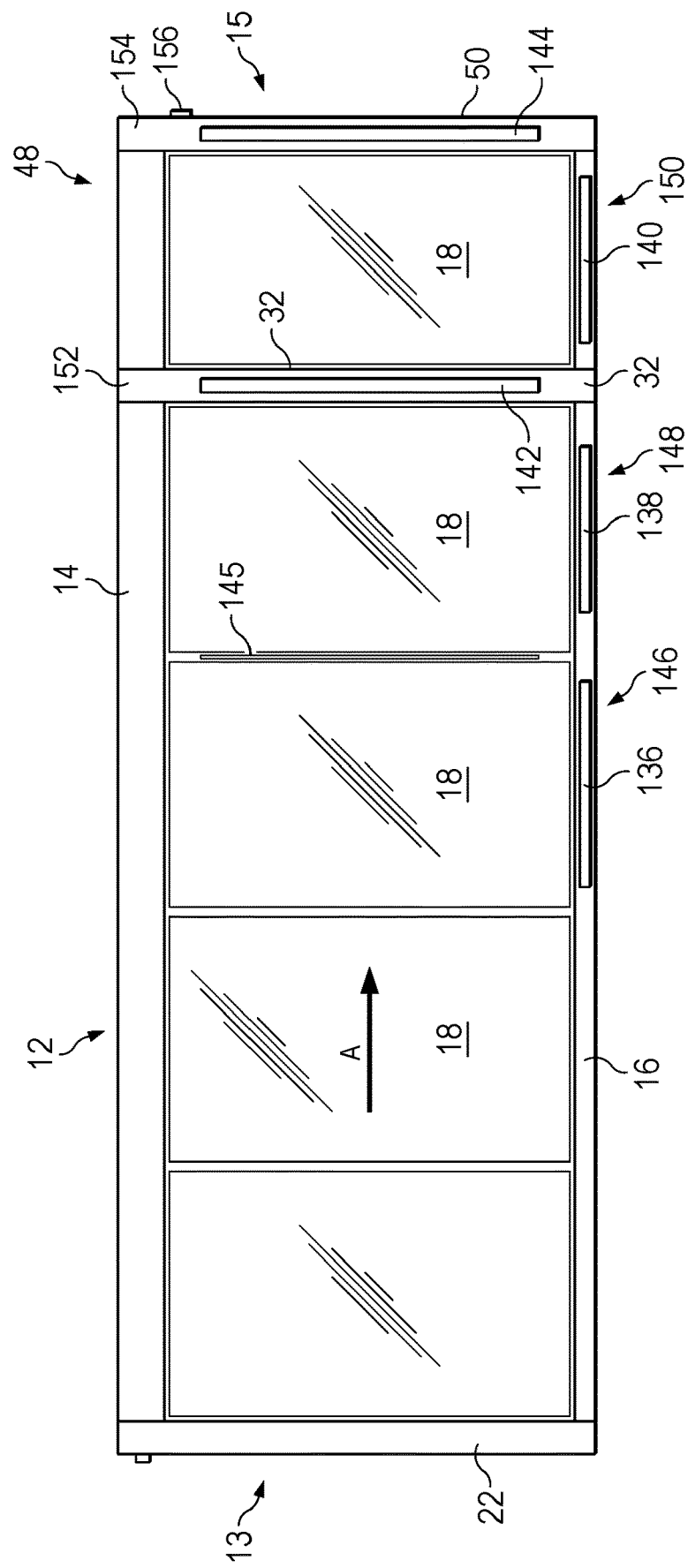
FIG. 13 is a side view of a portion of a secure exit lane in accordance with the present disclosure.

In some instances, it may be desirable to have secure exit lanes 12 with additional sensors, additional processing by the controller 76 of the signals received from the sensors, and enhanced control of the door system 12. Such secure exit lanes may have enhanced ability to detect and mitigate certain threats or objects present or moving through the secure exit lane 12. In particular, such door systems 12 may have an increased ability to detect and react to objects thrown or otherwise moving in an undesirable direction (such for example, from an unsecured area 19 toward a secured area 17). FIGS. 12 and 13 illustrate additional features and elements that may be present to some secure exit lanes 12. In FIGS. 12 and 13 the generally desired direction for movement for both people 28 and objects through the secure exit lane 12 is from left to right as indicated by arrows A.

FIG. 12 is a partial view of a secure exit lane 12 taken from above the floor. The floor is not shown in FIG. 12. Starting at the entry end 13 the doors 24, 26 are in the open position. A presence sensor 130 is mounted to the ceiling 42 and oriented and configured to detect an object (or person 28 see, for example FIG. 2) in the secure exit lane 12 near the entrance end 13. The secure exit lane 12 has multiple side panels 18 to ensure the only way in and out of the secure exit lane 12 is through the doors 24, 26, 34, 36.

In addition to the lights 46 mounted in the ceiling 42, additional lighting 106 may be mounted to the entry and exit frame 22 and 32 as shown in FIG. 12 and/or elsewhere as desired. The additional lighting 106 and/or lights 46 may be LED lights or any other suitable type lights. As previously described, vents 70 may be mounted in the ceiling 42. A directional sensor 132 may be mounted to the ceiling 42 or otherwise mounted before and/or after the doors 34 and 36 to detect objects or people 28 and corresponding direction of motion. The sensors 132 may be mounted to the ceiling 42 or extension ceiling 72 in the exit extension 48 as shown or on other structure such as the exit header 30, exit frame 32 extension frame 50, side panels 18 or any other suitable structure.

As shown in FIGS. 12 and 13, curtain sensors 136, 138, 140 are located primate to the floor of the secure exit lane 12 similar to the curtain sensor 77 shown in FIG. 9. The curtain sensors 136, 138 and 140 are operatively connected to the controller 76 (See FIG. 11).

FIG. 13 is a side view of the secure exit lane 12. The entrance 13 in on the left as shown in FIG. 13 The side panels 18 are located between the upper frame 14 and the lower frame 16. Curtain sensors 136, 138 and 140 represented by boxes in FIG. 13 are mounted to the lower frame 16 inside the secure exit lane 12. Additional curtain sensors 142, 144, and 145 may be mounted to the exit frame 32 and the extension frame 50 of the exit extension 48 near the end 15.

In accordance with the present disclosure, the ability of being able to detect movement of objects or people 28 particularly wrong way movement (in the direction opposite of arrows A) may be enhanced by dynamic manipulation of the curtain sensors 136, 138, 140, 142, 144 in the exit lane 12. In particular, the ability to detect thrown objects in the wrong direction (opposite the direction indicated by arrows A) may be enhanced.

In some embodiments, the secure exit lane 12 may have several zones A-I as described with respect to FIG. 10 and/or zones as shown and described with respect to FIG. 13: a first exit zone 146 (which may correspond to zone F as described with respect to FIG. 10) the second exit zone 148 (which may correspond to zone G, as described with respect to FIG. 10), and/or an extension zone 150 (which may correspond to zone H, as described with respect to FIG. 10). While three zones 146, 148, and 150 are described in detail below, it will be understood by one skilled in the art after reviewing this disclosure, that a secure exit 12 lane may use two, three or more zones to achieve enhanced object detection.

The zones 148, and 150 contain an Object Detection (OD) light curtain 142 (in zone 148), 144 (in zone 140) and 130 that will detect an object thrown through a doorway coupled with a People Detecting (PD) light curtains 136, 138, 140 that will cause the OD light curtains 142, 144 to turn on and off. Optionally, additional zones such as zone 136 may contain a PD light curtain 146 and an OD light curtain 145.

The OD light curtains 142, 144, and 145 may reside in vertical pillars 152 adjacent to the exit doors 34, 36 (see FIG. 12 for example) which are part of the exit frame 32 and/or vertical pillars 154 that are part of the extension frame 50 or other suitable portions of the secure exit lane 12. The light curtains 142, 144 and 145 are oriented and configured similar to the sensors 71 shown in FIG. 9 to sense the presence of an object in the exit lane 12. The PD light curtains 136, 148 and 150 reside in horizontal pockets in the lower frame 16 that is adjacent to the floor. Zone 150 of both types of light curtains 140, 144 are located a few feet after the exit doors 34, 36 in the extension 48.

Generally the OD light curtains 142, 144, 145 contain beams (similar to those shown at 71 in FIG. 9) that can detect an object in the exit lane 12. The presence or movement of such an object in the path of the light beams of sensors 142, 144, 145 will break one of the beams in the OD light curtains 142, 144, 145 or otherwise trip the sensor 142, 144, 145. When the sensors 142, 144, 145 are tripped, they send a signal to the controller 76 (see FIG. 11) to inform the controller 76 that a beam has been broken or the sensor is otherwise tripped. This signal may be indicative of the presence and/or movement of an object.

In addition to detecting and preventing people 28 from moving the wrong way (in the opposite direction than indicated by arrows A) it may be desirable to detect and prevent objects from being thrown into the secure exit lane 12 in the wrong direction to avoid these objects from moving (or being passed to a person 28) from an unsecured area 17 (See FIG. 1) to a secured area 19 (see FIG. 1) via the secure exit lane 12.

Sensors such as OD light curtains 142, 144, 145 do a good job of detecting objects present, and if monitored by the controller 76 by comparing and analyzing timing of signals from the OD light curtains 142, 144, 145 the controller 76 may determine speed and direction of travel of an object moving through the secure exit lane 12. However, people 28 moving through the exit lane 12 in a desired manner (in the direction indicated by arrows A) may also trip the OD light curtains 142, 144, 145. This may cause "false" signals to be sent to the controller 76 indicating that an object is moving or present in the secure exit lane 12.

In order to avoid having to respond to "false" signals of a potential undesired movement of people 28 through the secure exit lane 12, when, in fact all that is happening is a person or people 28 are moving appropriately through exit lane 12, the OD light curtains 142, 144, 145 may be selectively turned off or OD light curtain 142, 144, 145 trip signals are ignored by the controller 76 under certain circumstances.

In some embodiments, a OD light curtain 142, 144, 145 remains on until a person steps into the path of the PD light curtain 136, 138, 140 breaking the beams in the light curtain 135, 138, 140. When this happens, as a signal is sent to the controller 76 (see FIG. 11). The controller 76 commands the OD light curtain 142, 144, or 146 associated with a particular PD light curtain 136, 138, 140 to turn off (or be temporarily disabled and allow people to pass without triggering the OD light curtain. The OD light curtain 142, 144, 145 will remain off as long as people stay in the path of the PD light curtain 136, 138, 140 and thereby allow the person to pass through the OD light curtains 140, 144, 145 out their way out of the exit lane 12 without causing the OD light curtains 140, 144, 145 to send a signal to the controller 76 that beams in the OD light curtains 142, 144, 145 have been broken or otherwise detected something passing through. Alternatively, if a signal is sent to the controller 76 the controller 76 will ignore or otherwise not react in a way it would normally react if a signal was sent had the OD sensors not been turned off or disabled.

Generally, the more zones 196, 198, 150 with corresponding sensors (88 which may include curtain sensors 136, 138, 140, 142, 144, 145) the better the secure exit lane 12 is able to detect objects moving the wrong way (in a direction opposite of arrows A in FIGS. 12 and 13). In some embodiments a minimum of two zones with corresponding sensors are used. Timing of the activating and deactivating the OD sensors 142, 144, 145 and linking which PD sensors 136, 138 and 140 cause which OD sensors 142, 144, 145 to be deactivated in the various zones is used to eliminate nuisance activation and is adjustable. When the Object Detection is activated by detection an object that is rolled, slid, thrown, or passed through the zone 146, 148, 150 by some means, the doors 22, 24 to the entrance may shut and/or the door system 12 enter an alarm mode.

As an example the PD sensors 136 may be linked to the OD sensors 145 of zone 146 so that when a person 28 is sensed by the PD sensors 136 the OD sensors 145 of zone 146 may be turned off or a signal from sensors 145 are not treated by the controller 76 as an object is detected. Likewise, PD sensors 148 may be linked to the OD sensors 142 of zone 148 so that when a person 28 is sensed by the PD sensors 148 the OD sensors 142 of zone 148 may be turned off or a signal from sensors 142 are not treated by the controller 76 as an object is detected. Similarly, PD sensors 140 may be linked to the OD sensors 144 of zone 150 so that when a person 28 is sensed by the PD sensors 140 the OD sensors 144 of zone 148 may be turned off or a signal from sensors 144 are not treated by the controller 76 as an object is detected. The pairing of the sensors maybe done by zone or any other suitable technique.

In some embodiments, the doors 34 36 may also shut and the secure exit lane 12 may go into an alarm condition (also referred to elsewhere herein as lock down mode). With reference to FIG. 11, the alarm condition may include the controller 76 activating one or more of the following: activating a camera 90, alerting security personnel 92, alerting a government agency 94, activating alarms 98, 100, activating an audio system 82, closing one or more doors 78, 80 (which may include doors 24, 26, 34, 36) activating a light system 84 and other actions 106. This may also stop the person who caught that object or the object itself from getting to the secure side 17 (See FIG. 1) of the airport. In addition to the entrance doors 24, 26 closing a red light may start blinking and a sound may play in the form "security violation." The doors 78, 80 (which may include all or some of the doors described herein) will not reopen until the alarm condition clears. The alarm condition may be set to clear automatically or may be set to require manual resetting.

By closing the doors 78, 80 upon this violation, the secure exit lane 12 attempts to prevent an objection from moving between a non secure area 19 to a secure area 17. Additionally secure exit lane 12 having an enhanced object detection function may also include an added a sensor 156 to the exit side or end 15 of the secure exit lane 12 operatively connected to the controller 76 (See FIG. 11) that prevents the exit doors 34, 36 from opening if a person 28 is detected to be standing proximate to the exit end 19 of the secure exit lane 12. Having the controller 76 monitor the signals from the additional sensor 156 and not open the doors 34, 36 if a person is detected to be standing proximate to the exit end 15 in the unsecure area 19 further assists in preventing someone getting close enough to be able to successfully through an object through the secure exit lane 12 from the unsecure area 19.

It will be understood that all of the sensors described herein may be attached to the controller 76 as described in FIG. 11 as sensor 86 and sensors r, 88. Specific types of sensors described herein are meant to be examples and not limiting. Further, it is noted that the sensors are described and detecting objects and people 28. Such statements are made for clarity or examples and are not meant to exclude people from the broader term "objects" as "objects" as used herein may include people, animals, inanimate articles, and the like.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

We claim:
1. A door system comprising:
   a corridor sized to allow humans to move through the corridor, the corridor defined, at least in part by side walls and a floor, the corridor having a first end and a second end;
   a first door located at the first end, the first door configured to provide selective access between the corridor and a space outside of the corridor;
   a second door located at the second end, the second door configured to provide selective access between the corridor and a space outside of the corridor;
   a controller operatively connected to the first and second doors for controlling the first and second doors;
   a first sensor oriented to detect an object on the floor, the first sensor operatively connected to the controller; and
   a second sensor oriented to detect an object above the floor in the corridor wherein the second sensor is operatively connected to the controller and the controller is configured to one of: a) turn off the second sensor when the first sensor detects an object on the floor and b) not respond when the second sensor detects an object above the floor when the first sensor detects an object on the floor.

2. The door system of claim 1 further comprising a presence sensor configured to detect movement outside and proximate to the corridor in a direction toward inside the corridor, the controller configured to control least one of the first and second doors to cause at least one of the first and second doors to close if the presence sensor detects movement of an object toward inside the corridor if the movement exceeds a threshold amount.

3. The door system of claim 1, further comprising various zones in the door system, wherein the first and second sensor are oriented and configured to detect an object in a same zone.

4. The door system of claim 1, further comprising:
   a third sensor oriented to detect an object on the floor, the third sensor operatively connected to the controller; and
   a fourth sensor oriented to detect an object above the floor in the corridor wherein the fourth sensor is operatively connected to the controller and the controller is configured to one of: a) turn off the fourth sensor when the third sensor detects an object on the floor and b) not respond when the fourth sensor detects an object above the floor when the third sensor detects an object on the floor.

5. The door system of claim 4, further comprising:
   a fifth sensor oriented to detect an object on the floor, the fifth sensor operatively connected to the controller; and
   a sixth sensor oriented to detect an object above the floor in the corridor, wherein the sixth sensor is operatively connected to the controller and the controller is configured to one of: a) turn off the sixth sensor when the fifth sensor detects an object on the floor and b) not respond when the sixth sensor detects an object above the floor when the fifth sensor detects an object on the floor.

6. The door system of claim 1, wherein the first and second sensors are curtain sensors.

7. The door system of claim 1, further comprising an alarm system operatively connected to the controller, wherein the controller is configured to activate the alarm system depending upon data received from the first and second sensors.

8. The door system of claim 1, further comprising a remote user input device operatively connected to the controller to input data to the controller.

9. The door system of claim 1, further comprising a data transmitter operatively connected to the controller, the data transmitter configured to transmit data from the controller to a remote destination.

10. The door system of claim 1, wherein at least one of either an audio and visual indicator is operatively connected to the controller, and the controller is configured to activate the at least one of either the audio and visual indicator to provide instructions to people located proximate to the door system.

11. The door system of claim 1, further comprising a camera operatively connected to the controller, the camera configured to provide data to the controller.

12. The door system of claim 1, further comprising a third door located between the first and the second doors, the third door located at a middle portion of the corridor.

13. A method of providing a secure exit comprising:
locating a first door at a first end of a corridor having a floor;
locating a second door at a second end of the corridor;
mounting a first sensor to detect an object on the floor;
mounting a second sensor to detect an object in the corridor located somewhere in the corridor other than the floor; and
operatively connecting a controller to the first and second doors and first and second sensors and configuring the controller to one of: a) turn off the second sensor when the first sensor detects an object on the floor and b) not react when the second sensor detects an object above the floor when the first sensor detects an object on the floor.

14. The method of claim 13, further comprising detecting motion outside the corridor in a direction toward the corridor and doing at least one of: 1) closing at least one of the first and second doors when movement in a direction toward the corridor exceeds a threshold amount and 2) keeping an already closed first and second door closed when movement in a direction toward the corridor exceeds a threshold amount.

15. The method of claim 13, further comprising:
mounting a third sensor to detect an object on the floor;
mounting a fourth sensor to detect an object in the corridor located somewhere in the corridor other than the floor; and
operatively connecting a controller to the first and second doors and third and fourth sensors and configuring the controller to one of: a) turn off the fourth sensor when the third sensor detects an object on the floor and b) not react when the fourth sensor detects an object above the floor when the third sensor detects an object on the floor.

16. The method of claim 13, further comprising receiving data from sensors detecting movement in the corridor and sending commands to at least one of the first and second doors based on the data received from the sensors.

17. The method of claim 16, further comprising: transmitting data regarding at least one of either the corridor and a corridor extension to a receiver remote from the corridor.

18. A door system comprising:
a corridor sized to allow humans to move through the corridor, the corridor defined, at least in part by side walls and a floor, the corridor having a first end and a second end;
a first sensor oriented to detect an object on the floor;
a second sensor oriented to detect an object above the floor in the corridor;
a controller; and
an alarm system operatively connected to the controller for activating when signaled to do so by the controller,
the first sensor operatively connected to the controller, and
wherein the second sensor is operatively connected to the controller and the controller is configured to one of: a) turn off the second sensor when the first sensor detects an object on the floor and b) not respond when the second sensor detects an object above the floor when the first sensor detects an object on the floor.

19. The door system of claim 18, wherein the controller is configured to activate the alarm system depending upon data received from the first and second sensors.

20. The door system of claim 18, further comprising a data transmitter operatively connected to the controller, the data transmitter configured to transmit data from the controller to a remote destination.

* * * * *

UNITED STATES PATENT AND TRADEMARK OFFICE
CERTIFICATE OF CORRECTION

| | | |
|---|---|---|
| PATENT NO. | : 12,475,754 B2 | Page 1 of 1 |
| APPLICATION NO. | : 18/521682 | |
| DATED | : November 18, 2025 | |
| INVENTOR(S) | : Ryan et al. | |

It is certified that error appears in the above-identified patent and that said Letters Patent is hereby corrected as shown below:

In the Specification

At Column 13, Line 37, "FIG. 11 as sensor 86 and sensors r, 88." should read --FIG. 11 as sensor 86 and sensors$_n$ 88.--

Signed and Sealed this
Twenty-third Day of December, 2025

John A. Squires
*Director of the United States Patent and Trademark Office*